United States Patent [19]

Lal et al.

[11] 4,340,705

[45] Jul. 20, 1982

[54] PREPARATION OF INTERPOLYMERS OF ALPHA-OLEFINS AND NONCONJUGATED ALPHA, OMEGA-POLYENES

[75] Inventors: Joginder Lal, Akron; Michael L. Senyek, Tallmadge, both of Ohio

[73] Assignee: The Goodyear Tire & Rubber Company, Akron, Ohio

[21] Appl. No.: 861,600

[22] Filed: Dec. 19, 1977

Related U.S. Application Data

[63] Continuation-in-part of Ser. No. 694,851, Jun. 10, 1976, abandoned.

[51] Int. Cl.$^3$ .......................... C08F 4/64; C08F 36/20
[52] U.S. Cl. .................... 526/139; 526/141; 526/336
[58] Field of Search ............................. 526/139, 336

[56] References Cited

U.S. PATENT DOCUMENTS

| | | | |
|---|---|---|---|
| 2,933,480 | 4/1960 | Gresham et al. | 526/336 |
| 3,574,176 | 4/1971 | Boozer | 526/141 |
| 3,595,842 | 7/1971 | Schrage et al. | 526/142 |
| 3,746,694 | 7/1973 | Cluff | 526/336 |
| 3,900,452 | 8/1975 | Valvassori et al. | 526/336 |
| 3,933,769 | 1/1976 | Lol et al. | 526/336 |
| 3,975,336 | 8/1976 | Lol et al. | 526/139 |

FOREIGN PATENT DOCUMENTS

| | | | |
|---|---|---|---|
| 836790 | 6/1960 | United Kingdom | 526/336 |
| 1089333 | 11/1967 | United Kingdom | 526/336 |

*Primary Examiner*—Edward J. Smith
*Attorney, Agent, or Firm*—J. D. Wolfe

[57] ABSTRACT

Interpolymers of alpha-olefins and nonconjugated alpha, omega-polyenes are prepared by organoaluminum compound-transition metal compound catalysts modified with hexaalkylphosphoric triamides or at least one compound of the formula $Q=P(X\ Y)_3$, wherein P is phosphorous, Q is oxygen or sulfur, X is oxygen or sulfur and Y is a hydrocarbon radical containing 1 to 20 carbon atoms.

7 Claims, No Drawings

PREPARATION OF INTERPOLYMERS OF ALPHA-OLEFINS AND NONCONJUGATED ALPHA, OMEGA-POLYENES

This application is a continuation-in-part application of Ser. No. 694,851, filed June 10, 1976, now abandoned.

This invention relates to an improved polymerization process and more particularly to the preparation of interpolymers of alpha-olefins with nonconjugated alpha, omega-polyenes containing at least two ethylenic unsaturated groups in the presence of coordination catalysts modified with hexaalkylphosphoric triamides or organophosphate esters.

It has now been discovered that modification of transition metal compound-organoaluminum compound catalyst systems with hexaalkylphosphoric triamides or organophosphate esters unexpectedly gives sulfur curable interpolymers of alpha-olefins and nonconjugated alpha, omegapolyenes containing at least two ethylenic double bonds, i.e. interpolymers having improved, cured properties such as tensile strength, cross-link density and swelling resistance to solvents.

These interpolymers are formed in high conversion and also exhibit high molecular weights. Also, the interpolymers possess sufficient unsaturation to be readily sulfur-cured and have a gel content in many cases of less than a few percent to zero. Due to this low gel content, they are suitable for fabricating or molding goods. These interpolymers are rubbery or leathery in nature, depending on their composition. However, rubbery polymers are preferred. They are highly ozone-resistant.

This invention is directed to sulfur vulcanizable unsaturated interpolymers of at least one terminally unsaturated monoolefin, wherein the monoolefin contains from four carbon atoms to about 12 carbon atoms with nonconjugated α,w-polyenes containing eight to about 36 carbon atoms, which may or may not contain internal unsaturation, wherein the said monoolefin comprises from about 95 to about 50 mole percent of the total monomers charged. Thus, the interpolymers of the present invention are prepared from about five to about 50 mole percent of charged alpha, omega polyenes and from about 95 to about 50 mole percent monoolefin.

Thus, the present invention is directed to the preparation of improved sulfur vulcanizable unsaturated interpolymers of at least one terminally unsaturated linear or branched monoolefin with a nonconjugated polyene which is an alpha, omega polyene, thus indicating that interpolymers with one or more alpha, omega polyenes may be prepared in accordance with the practice of this invention, and said terminally unsaturated monoolefin comprises from about 95 to about 50 mole percent of the total monomer charged.

Illustrative examples of the terminally unsaturated monoolefins are: 1-butene, 1-pentene, 1-hexene, 4-methyl-1-pentene, 4-methyl-1-hexene, 5-methyl-1-hexene, 1-octene, 1-decene, 1-undecene, 1-dodecene and the like. The linear monoolefins are preferred.

Illustrative examples of suitable alpha, omegapolyenes containing at least eight carbon atoms are 1,7-octadiene, 1,8-nonadiene, 1,9-decadiene, 1,10-undecadiene, 1,11-dodecadiene, 1,12-tridecadiene, 1,13-tetradecadiene, 1,4,9-decatriene, 1,5,9-decatriene, 1,6,9-decatriene, 1,5,9,13,17-octadecapentadiene, 1,9,17-octadecatriene, 1,4,7-octatriene and the like.

The improved polymerization process of the present invention may be accomplished by the use of a catalytic mixture containing (A) at least one organo-aluminum compound having the formula $RAlX_2$, $R_3Al_2X_3$, $R_2AlX$, or $R_3Al$ wherein R is a hydrocarbon radical containing one to 12 carbon atoms and selected from the group of alkyl and/or aryl radicals and X is a halide selected from the group consisting of chloride, bromide, and iodide radicals, (B) at least one compound or salt of a transition metal selected from Groups IVB, VB, and VIB of the Periodic Table, and (C) at least one compound having the general formula: $Q=P(XY)_3$, wherein P is phosphorous, Q is oxygen or sulfur, X is oxygen or sulfur and Y is a hydrocarbon radical containing from 1 to 20 carbon atoms or a hexahydrocarbon phosphoric triamide having 1 to 20 carbon atoms in the hydrocarbon radical. Examples of these Y or hydrocarbon radicals are alkyl, alkenyl, aralkyl, aryl, alkaryl and cycloalkyl radicals containing 1 to 20 carbon atoms and preferably 1 to 10 carbon atoms.

The preferred organoaluminum compounds, i.e. component A, are the lower alkyl derivatives, and the most preferred are ethylaluminum dichloride, diethylaluminum chloride, ethyl aluminum sesquihalide, triethylaluminum and triisobutylaluminum.

The preferred transition metals of component B are titanium, zirconium, vanadium, chromium and molybdenum. The compounds of transition metals are preferably halides, oxyhalides, alkoxides and acetylacetonates. Titanium trichloride is preferred.

Preferred compounds for component C are hexaalkylphosphoric triamides or organophosphate esters. Among the specific compounds that can be used are hexamethylphosphoric triamide, hexaethylphosphoric triamide, triethyl trimethylphosphoric triamide, trimethyl tripropylphosphoric triamide, hexamethylthiophosphoric triamide, hexaethylthiophosphoric triamide, tri-n-butyl phosphate, triallyl phosphate, trimethyl phosphate, triethyl phosphate, triphenyl phosphate, O,O,O-triethylphosphorothioate, O,O,O-tri-n-butylphosphorothioate, O,O,O-trimethylphosphorothioate, O,O,O-triphenylphosphorothioate, trimethylphosphorotetrathioate, triethylphosphorotetrathioate, triphenyl phosphorotetrathioate, S,S,S-trimethyl phosphorotrithioate, S,S,S-triethyl phosphorotrithioate, S,S,S-triphenyl phosphorotrithioate, O,S,S-triethylphosphorotrithioate, and the like.

Ordinarily, the transition metal compound useful in forming the catalyst is employed in an amount such as to provide about 0.0002 to 0.01, preferably about 0.001 to 0.008 mole of transition metal compound per mole of monomers being polymerized. The organoaluminum compound is usually employed in an amount so as to provide an organoaluminum compound/transition metal compound molar ratio of about 0.5 to 15, preferably about 0.75 to 5, most preferably about 1.0 to 4.0. The component C is usually employed in an amount so as to provide a component C/organoaluminum compound molar ratio of about 0.1 to 2, preferably 0.2 to 1.5.

The amount of catalyst by weight is from about 0.1 to about 10 phm (parts per hundred of monomers), the preferred range being about 0.5 to 5 phm.

The polymerization can be conducted in an inert solvent. By "inert solvent" is meant one that will not adversely affect the reaction rate or reaction product. Suitable solvents are aliphatic, aromatic or cycloaliphatic hydrocarbons. Representatives of such solvents are heptane, hexane, pentane, benzene, toluene, cyclopentane, cyclohexane and the like. Chlorinated hydrocarbons such as trichloroethylene, tetrachloroethylene and chlorobenzene may be used.

The polymerization reactions involved in this invention can be carried out over a wide range of temperatures. It is convenient to carry out the process at temperatures of −20° C. to 100° C., preferably 0° C. to 50° C. The reactions may be carried out at atmospheric pressure, subatmospheric pressure, or superatmospheric pressure.

EXPERIMENTAL

An illustrative catalyst system suitable for the polymerization reaction consisted of commercially available α-titanium trichloride-diethylaluminum chloride (α-TiCl$_3$-Et$_2$AlCl), α-titanium trichloride-ethylaluminum dichloride (α-TiCl$_3$-EtAlCl$_2$), α-titanium trichloride-triethylaluminum (α-TiCl$_3$-Et$_3$Al), or α-titanium trichloride-triisobutylaluminum [α-TiCl$_3$-(i-Bu)$_3$Al]. The α-TiCl$_3$ complex used contained 0.33 mole of aluminum trichloride per mole of α-TiCl$_3$. The preferred order of addition of components was: Component A, Component C, Component B.

Unless otherwise stated, all polymerization reactions were conducted in bottles in a nitrogen atmosphere. The bottles were tumbled end-on-end in a polymerization bath kept at a constant temperature. The polymerization mixture was precipitated in excess methanol or isopropyl alcohol containing 0.1 percent 2,6-di-tert-butyl-p-cresol, as a stabilizer, followed by drying under reduced pressure.

As employed in this specification, inherent viscosity is defined as the natural logarithm of the relative viscosity at 30° C. divided by the polymer concentration for a 0.05 to 0.10 percent (w./v.) solution in toluene, chloroform, or tetrachloroethylene and expressed in units of deciliters per gram (dl./g.).

Percent insolubility of vulcanizates in toluene was determined at 25° C. after immersion in toluene for 72 hours by placing one gram of sample in 200 milliliters (ml.) of toluene. The toluene solvent was changed after 24, 48 and 72 hours. The swollen sample was weighed and subsequently dried under vacuum to determine the weight of insoluble gel. From the same measurement, swelling ratio, Q, of the gel fraction was calculated as the ratio of the weight of toluene in the swollen sample to the weight of the toluene insoluble gel. The percent insolubility and swelling ratio were corrected for the amount of filler present in a vulcanizate.

The practice of this invention is illustrated by reference to the following examples which are intended to be representative rather than restrictive of its scope.

EXAMPLE I

A solution containing 54 grams (0.64 mole) 1-hexene, 3.8 grams (0.034 mole) 1,7-octadiene, and 80 ml. pentane was sparged with nitrogen in an eight-ounce bottle. The molar charge ratio of 1-hexene to 1,7-octadiene was 95:5. To the solution, the required amount of Et$_2$AlCl, hexamethylphosphorictriamide, and 1.0 millimole α-titanium trichloride were added in the order indicated. The molar ratio of Et$_2$AlCl to α-TiCl$_3$ was 1.5:1, and the molar ratio of hexamethylphosphoric triamide to Et$_2$AlCl was 0.2:1. The copolymerization was allowed to proceed for 24 hours at 25° C. The resulting copolymer was isolated by precipitation in excess methanol (79 percent conversion). The copolymer had inherent viscosity of 6.6 (toluene solvent) and contained no gel. The copolymer from a control bottle prepared similarly but without hexamethylphosphoric triamide added to the Et$_2$AlCl-α-TiCl$_3$ catalyst had an inherent viscosity of 3.5 and 25 percent gel content measured in toluene. These data demonstrate that modification of the polymerization catalyst with hexamethylphosphoric triamide led to the formation of a higher molecular weight, gel-free copolymer of 1-hexene and 1,7-octadiene.

EXAMPLE II

A premix of 55.4 grams (0.986 mole) 1-butene, 48.6 grams (0.578 mole) 1-hexene, and 9.06 grams (0.082 mole) 1,7-octadiene (molar charge ratio 60:35:5) in 450 grams benzene was polymerized with Et$_2$AlCl/hexamethylphosphoric triamide/α-TiCl$_3$ catalyst (4.0 millimoles α-TiCl$_3$) at 25° C. for 72 hours. The molar ratio of Et$_2$AlCl to TiCl$_3$ was 1.5:1 and of the phosphoric triamide to Et$_2$AlCl was 0.2:1. The conversion to terpolymer was 82 percent. It had an inherent viscosity of 5.5, and contained no gel as measured in chloroform. A terpolymer prepared similarly, but without hexamethylphosphoric triamide was obtained in 84 percent conversion. It had an inherent viscosity of 3.2 and 23 percent gel content as measured in chloroform.

The rubbery polymers were compounded with the following recipe, on a weight basis:

| Ingredients | Parts |
| --- | --- |
| Rubber | 100 |
| ISAF carbon black | 50 |
| Zinc oxide | 5 |
| Stearic acid | 2 |
| Sulfur | 2 |
| 2-Mercaptobenzothiazole | 0.5 |
| Tetramethylthiuram disulfide | 1 |

Vulcanizates were prepared by curing the compounded rubbers in a press for 20 minutes at 310° F. Some properties of the vulcanizates are given below:

| | Terpolymer prepared with hexamethylphosphoric triamide modification | Terpolymer prepared without modification (Control) |
| --- | --- | --- |
| Tensile strength, psi | 2770 | 2210 |
| Elongation at break, % | 510 | 540 |
| 300% Modulus, psi | 1180 | 925 |
| Wt. Swelling Ratio, Q* | 3.1 | 3.4 |
| Percent solubility, toluene | 3.5 | 10.0 |

*Grams of toluene per gram of rubber gel. Qualitatively, the higher the value of Q the lower is the crosslink density.

The data on crosslink density (300% modulus and swelling ratio), and percent solubility show that the polymer obtained with the modified catalyst on vulcanization gave higher crosslink density than the control polymer. Tensile strength of the vulcanizate of the polymer resulting from the modified catalyst was also superior to that of the control sample. These data show that modification of the polymerization catalyst with hexamethylphosphoric triamide produced a higher molecular weight, gel-free rubber which gives superior vulcanizate properties than those obtainable in the control experiment.

EXAMPLE III

A solution of 81.5 grams (0.966 mole) 1-hexene and 5.61 grams (0.0509 mole) 1,7-octadiene (molar charge ratio 95:5) in 560 ml. pentane was polymerized with the required amount of Et$_2$AlCl, hexamethylphosphoric triamide and α-TiCl$_3$ (4.0 millimoles α-TiCl$_3$) at 25° C. for 21 hours. The molar ratio of hexamethylphosphoric triamide to Et$_2$AlCl was 0.7:1 and of Et$_2$AlCl to TiCl$_3$ was 4.0:1. The conversion to copolymer was 75 percent, inherent viscosity was 2.3, and there was no gel. A copolymer prepared similarly at a molar ratio of Et$_2$AlCl to TiCl$_3$ of 1.5:1 and of phosphoric triamide to Et$_2$AlCl of 0.7:1 was obtained in 72 percent conversion, with inherent viscosity of 2.9 and zero gel content.

EXAMPLE IV

A solution of 54 grams (0.64 mole) 1-hexene and 7.9 grams (0.072 mole) 1,7-octadiene (molar charge ratio 90:10) in 80 ml. pentane was polymerized with the required amount of Et$_2$AlCl/hexamethylphosphoric triamide/α-TiCl$_3$ catalyst (2.4 millimoles α-TiCl$_3$). The molar ratio of hexamethylphosphoric triamide to Et$_2$AlCl was 0.7:1 and of Et$_2$AlCl to TiCl$_3$ was 1.5:1. After agitating for 24 hours at 25° C., the resulting copolymer was isolated by methanol coagulation and dried. The conversion to copolymer was 83 percent, inherent viscosity 3.0 and percent gel=0. A copolymer prepared similarly but without hexamethylphosphoric triamide was obtained in 95 percent conversion. It had inherent viscosity of 1.1 and 78 percent gel. These data show the remarkable ability of the modified catalyst to suppress gel formation during polymerization while producing a higher molecular weight copolymer.

EXAMPLE V

A solution of 54 grams (0.64 mole) 1-hexene and 7.9 grams (0.072 mole) 1,7-octadiene (molar charge ratio 90:10) in 80 ml. pentane was polymerized as in Example I with EtAlCl$_2$/hexamethylphosphoric triamide/α-TiCl$_3$ catalyst (2.4 millimoles α-TiCl$_3$). The molar ratio of EtAlCl$_2$ to TiCl$_3$ was 1.5:1 and of the phosphoramide to EtAlCl$_2$ was 0.7:1. The resulting copolymer was obtained in 91 percent conversion, with inherent viscosity of 4.1 and zero percent gel.

EXAMPLE VI

A solution of 54 grams (0.64 mole) 1-hexene and 23.6 grams (0.215 mole) 1,7-octadiene (molar charge ratio 75:25) in 80 ml. pentane was polymerized with Et$_2$AlCl/hexamethylphosphoric triamide/α-TiCl$_3$ catalyst (2.4 millimoles α-TiCl$_3$). The molar ratio of Et$_2$AlCl to α-TiCl$_3$ was 1.5:1 and of phosphoramide to Et$_2$AlCl was 0.7:1. The resulting copolymer was obtained in 47 percent conversion, with an inherent viscosity of 3.6, and only three percent gel. Reference to Example IV would suggest that the unmodified catalyst would have produced copolymer containing more than 78 percent gel.

EXAMPLE VII

A solution of 54 grams (0.64 mole) 1-hexene and 3.8 grams (0.034 mole) 1,7-octadiene (molar charge ratio 95:5) in 80 ml. pentane was polymerized with Et$_2$AlCl/triethylphosphate/α-TiCl$_3$ catalyst (1.0 mmole α-TiCl$_3$). The molar ratio of Et$_2$AlCl to α-TiCl$_3$ was 1.5:1 and of triethyl phosphate to Et$_2$AlCl was 0.7:1. After agitation for 24 hours at 25° C., the resulting copolymer was isolated by methanol coagulation and dried. The conversion to copolymer was 74 percent, with an inherent viscosity of 5.1 and zero percent gel. A copolymer prepared similarly but without triethyl phosphate was obtained in 84 percent conversion. It had an inherent viscosity of 4.8 and 20 percent gel. These data show that triethyl phosphate, like hexamethylphosphoric triamide, suppresses gel formation during polymerization.

EXAMPLE VIII

A solution of 54 grams (0.64 mole) 1-hexene and 3.8 grams (0.034 mole) 1,7-octadiene (molar charge ratio 95:5) in 80 ml. pentane was polymerized with Et$_2$AlCl/tri-n-butyl phosphate/α-TiCl$_3$ catalyst (1.0 millimole α-TiCl$_3$). The molar ratio of Et$_2$AlCl to TiCl$_3$ was 1.5:1 and of phosphate to Et$_2$AlCl was 0.7:1. The resulting copolymer was obtained in 82 percent conversion, with an inherent viscosity of 5.0 and zero percent gel. A copolymer prepared similarly but without tri-n-butyl phosphate modification had an inherent viscosity of 4.8 and 20 percent gel.

EXAMPLE IX

A solution of 54 grams (0.64 mole) 1-hexene and 3.8 grams (0.034 mole) 1,7-octadiene (molar charge ratio 95:5) in 80 ml. pentane was polymerized with Et$_2$AlCl/triphenyl phosphate/α-TiCl$_3$ catalyst (1.0 millimole α-TiCl$_3$). The molar ratio of Et$_2$AlCl to TiCl$_3$ was 1.5:1 and of phosphate to Et$_2$AlCl was 0.7:1. The resulting copolymer was obtained in 75 percent conversion, with an inherent viscosity of 5.3 and 10 percent gel. A copolymer prepared similarly but without triphenyl phosphate modification was obtained in 84 percent conversion. It had an inherent viscosity of 4.8 and 20 percent gel.

EXAMPLE X

A solution of 54 grams (0.64 mole) 1-hexene and 6.6 grams (0.034 mole) 1,13-tetradecadiene (molar charge ratio 95:5) in 80 ml. benzene was polymerized with Et$_2$AlCl/hexamethylphosphoric triamide/α-TiCl$_3$ catalyst (1.7 millimoles α-TiCl$_3$) at 25° C. for 24 hours. The molar ratio of Et$_2$AlCl to TiCl$_3$ was 1.5:1 and of the phosphoric triamide to Et$_2$AlCl was 1.1:1. The copolymer conversion was 92 percent, with an inherent viscosity of 5.7, two percent gel, and an unsaturation value of 0.24 mole/kg. as measured by the iodine monochloride method. A copolymer prepared similarly with Et$_2$AlCl and α-TiCl$_3$ catalyst (0.6 millimole TiCl$_3$), but without hexamethylphosphoric triamide, had an inherent viscosity of 2.5 and 90 percent gel. It was obtained in 78 percent conversion. These data demonstrate the dramatic effect of the triamide modified catalyst in essentially eliminating gel during the copolymerization of hexene and 1,13-tetradecadiene.

EXAMPLE XI

A premix of 1033 grams (18.4 moles) 1-butene, 1042 grams (12.4 moles) 1-hexene, and 296 grams (2.68 moles) 1,7-octadiene (molar charge ratio 55:37.8) in 9480 grams n-heptane was polymerized with Et$_2$AlCl/hexamethylphosphoric triamide/α-TiCl$_3$ catalyst (0.125 mole α-TiCl$_3$) for 22 hours at 30° C. The molar ratio of Et$_2$AlCl to TiCl$_3$ was 1.5:1 and of phosphoric triamide to Et$_2$AlCl was 0.3:1. The conversion to terpolymer was 56 percent, with an inherent viscosity of 2.8, zero percent gel (chloroform) and an unsaturation value of 0.35 mole/kg.

EXAMPLE XII

Individual aliquots, each containing a solution of 54 grams (0.64 mole) 1-hexene and 3.8 grams (0.034 mole) 1,7-octadiene (molar charge ratio 95:5) in 80 ml. pentane were polymerized according to the procedure in Example I with each of the five different catalysts shown below as A to E:

| Catalyst | Additive | Copolymer Conversion, % | Inherent Viscosity* | Percent Gel* |
|---|---|---|---|---|
| A | None | 84 | 4.8 | 17 |
| B | Triethyl phosphite | 40 | 7.4 | 21 |
| C | Triethyl phosphite | 11 | — | — |
| D | Tri-n-butylamine | 74 | 4.9 | 21 |
| E | Hexamethyl phosphoric triamide | 64 | 4.5 | 0 |

*Toluene solvent, 30° C.
A 1.50 millimoles Et$_2$AlCl and 1.00 millimoles α-TiCl$_3$.
B 1.50 millimoles Et$_2$AlCl, 1.00 millimole α-TiCl$_3$, and 0.60 millimole triethyl phosphite.
C 1.50 millimoles Et$_2$AlCl, 1.00 millimole α-TiCl$_3$, and 1.05 millimoles triethyl phosphite.
D 1.50 millimoles Et$_2$AlCl, 1.00 millimole α-TiCl$_3$, and 1.05 millimoles tri-n-butylamine.
E 1.50 millimoles Et$_2$AlCl, 1.00 millimole α-TiCl$_3$, and 1.05 millimoles hexamethylphosphoric triamide.

These data demonstrate that triethyl phosphite and tri-n-butylamine modifiers were ineffective in reducing the gel. Only hexamethyl phosphoric triamide gave copolymer free from gel. Hence, it appears that it can not be predicted which modifier will give low gels with this system.

In another experiment, a solution of 54 grams (0.64 mole) 1-hexene and 3.8 grams (0.034 mole), 1,7-octadiene (molar charge ratio 95:5) in 80 ml. benzene was polymerized with Et$_2$AlCl/α-picoline/α-TiCl$_3$ catalyst (1.0 mmole α-TiCl$_3$). The molar ratio of Et$_2$AlCl to α-TiCl$_3$ was 1.5:1. The resulting copolymer was obtained in 82 percent conversion, with an inherent viscosity of 5.3 and 49 percent gel, thus indicating the ineffectiveness of α-picoline in reducing gel during copolymerization of this system.

EXAMPLE XIII

A solution of 875 grams (10.4 moles) 1-hexene and 61.5 grams (0.56 mole) 1,7-octadiene (molar charge ratio 95:5) in 1300 ml. n-pentane was polymerized with Et$_2$AlCl/hexamethyl phosphoric triamide/α-TiCl$_3$ catalyst (10 millimoles α-TiCl$_3$) for 48 hours at 25° C. The molar ratio of Et$_2$AlCl to TiCl$_3$ was 1.5:1 and of the phosphoric triamide to Et$_2$AlCl was 0.7:1. The conversion to copolymer was 52 percent, with an inherent viscosity of 6.3, zero percent gel, and an unsaturation value of 0.57 mole/kg. as measured by the iodine monochloride method. Similarly, a solution of 54 grams (0.64 mole) 1-hexene and 2.8 grams (0.034 mole) 1,5-hexadiene (molar charge ratio 95:5) in 80 ml. pentane was polymerized with Et$_2$AlCl/hexamethyl phosphoric triamide/α-TiCl$_3$ catalyst (1.6 millimoles α-TiCl$_3$) for 24 hours at 25° C. The molar ratio of Et$_2$AlCl to TiCl$_3$ was 1.5:1 and of the phosphoric triamide to Et$_2$AlCl was 0.6:1. The conversion to copolymer was 51 percent with an unsaturation value of 0.08 mole/kg. The unsaturation data demonstrate the dramatic difference between 1,7-octadiene and 1,5-hexadiene during copolymerization with 1-hexene with the hexamethyl phosphoric triamide modified catalyst. With 1,5-hexadiene there is a dramatic loss of unsaturation, presumably because of the formation of cyclic units.

Thus, this invention is directed to an improved process for preparing sulfur vulcanizable unsaturated interpolymers of enhanced inherent viscosity and unsaturation and essentially free of gel and which give vulcanizates having improved stress-strain properties. This process comprises reacting at least one terminally unsaturated monoolefin selected from the group consisting of α-olefins containing four to 12 carbon atoms with at least one nonconjugated polyene of the alpha-omega type.

Thus, this invention also yields as compositions of matter, low-gel, improved unsaturation interpolymers of α-olefins containing 4 to 12 carbon atoms with alpha-omegapolyenes containing at least 8 carbon atoms.

While certain representative embodiments and details have been shown for the purpose of illustrating the invention, it will be apparent to those skilled in this art that various changes and modifications may be made therein without departing from the spirit or scope of the invention.

What is claimed is:

1. A process of making low-gel, improved unsaturation interpolymers from about 95 to about 5 mole percent of at least one alpha-olefin containing from 4 to 12 carbon atoms and about 5 to about 50 mole percent of at least one second monomer selected from the class of alpha, omega-polyenes containing at least two ethylenic double bonds and having at least 8 carbon atoms in the presence of coordination catalysts prepared from components (A) an organoaluminum compound, (B) a transition metal compound selected from Groups IVB, VB, and VIB of the Periodic Table, and (C) at least one compound of the general formula Q=P(XY)$_3$ where P is phosphorous, Q is oxygen or sulfur, X is oxygen or sulfur and Y is a hydrocarbon radical containing from 1 to 20 carbon atoms or a hexahydrocarbon phosphoric triamide having 1 to 20 carbon atoms in the hydrocarbon radical.

2. The process of claim 1 wherein the second monomer is selected from the class consisting of 1,7-octadiene, 1,9-decadiene and 1,13-tetradecadiene.

3. The process of claim 1 wherein the component (C) is selected from the class consisting of hexamethylphosphoric triamide, hexaethylphosphoric triamide, hexamethylthiophosphoric triamide, triethyl phosphate, tri-n-butyl phosphate, triphenyl phosphate, and S,S,S-trimethyl phosphorotrithioate.

4. The process of claim 1 wherein the molar ratio of component (A) to component (B) is 0.5 to 15 and the molar ratio of component (C) to component (A) is 0.1 to 2.

5. The process of claim 1 wherein component (B) is a titanium compound.

6. The process of claim 1 wherein the alpha, omega-polyene is 1,7-octadiene and component (C) is hexamethylphosphoric triamide.

7. The process of claim 1 wherein the alpha, omega-polyene is 1,7-octadiene and component (C) is selected from the class consisting of triethyl phosphate, tri-n-butyl phosphate, and S,S,S-trimethyl phosphorotrithioate.

* * * * *